US012803421B2

(12) United States Patent
Koh et al.

(10) Patent No.: US 12,803,421 B2
(45) Date of Patent: Nov. 17, 2026

(54) APPARATUS FOR SUPPLYING POWER TO SEAT

(71) Applicant: HYUNDAI TRANSYS INC., Seosan-si (KR)

(72) Inventors: Sang Kyung Koh, Yongin-si (KR); Jae Seung Youn, Busan (KR); Se Min Kim, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 52 days.

(21) Appl. No.: 19/047,748

(22) Filed: Feb. 7, 2025

(65) Prior Publication Data

US 2025/0260307 A1 Aug. 14, 2025

(30) Foreign Application Priority Data

Feb. 14, 2024 (KR) ........................ 10-2024-0020750

(51) Int. Cl.

| | |
|---|---|
| ***H02M 1/32*** | (2007.01) |
| ***B60N 2/06*** | (2006.01) |
| ***H02H 3/087*** | (2006.01) |
| ***H02M 7/219*** | (2006.01) |

(52) U.S. Cl.

CPC ................ *H02M 1/32* (2013.01); *B60N 2/06* (2013.01); *H02H 3/087* (2013.01); *H02M 7/219* (2013.01)

(58) Field of Classification Search

CPC .......... H02M 1/32; H02M 7/219; B60N 2/06; B60N 2/005; H02H 3/087; H02H 5/042; B60R 16/03; H02J 7/65; H02J 7/663

USPC ........................................................ 361/91.1

See application file for complete search history.

(56) References Cited

U.S. PATENT DOCUMENTS

| | | | | |
|---|---|---|---|---|
| 7,560,831 | B2 * | 7/2009 | Whitted | G06F 1/30 307/64 |
| 8,049,455 | B2 * | 11/2011 | Kitanaka | B60L 3/04 388/903 |
| 10,848,008 | B2 * | 11/2020 | Cho | H02J 50/05 |

(Continued)

FOREIGN PATENT DOCUMENTS

| | | |
|---|---|---|
| JP | 08-241138 A | 9/1996 |
| KR | 10-0403825 B | 11/2000 |

(Continued)

OTHER PUBLICATIONS

Request for the Submission of an Opinion dated Aug. 22, 2025 from Korea Application No. 10-2024-0020750.

(Continued)

*Primary Examiner* — Dharti H Patel

(74) *Attorney, Agent, or Firm* — Quantum Patent Law Firm; Seongyoune Kang

(57) ABSTRACT

The seat power supply apparatus may include a rectifier circuit configured to rectify an input voltage input through a slide rail of a seat, a protection circuit including a protection transistor connected to the rectifier circuit to block a voltage output from the rectifier circuit, and a logic circuit including a switching element connected to a gate of the protection transistor to control on or off of the protection transistor. The protection transistor may be turned on or off according to on/off of the switching element so that output of the protection circuit is controlled.

14 Claims, 3 Drawing Sheets

(56) References Cited

U.S. PATENT DOCUMENTS

| | | | | |
|---|---|---|---|---|
| 11,710,960 | B2 * | 7/2023 | Tan | B60R 16/03<br>361/87 |
| 11,721,508 | B2 * | 8/2023 | Telefus | G01R 31/3277<br>361/42 |
| 12,017,559 | B2 * | 6/2024 | Werschler | B60N 2/06 |
| 2020/0108768 | A1 * | 4/2020 | Ali | B60K 35/21 |
| 2023/0162937 | A1 * | 5/2023 | Telefus | G01R 15/202<br>361/2 |
| 2023/0187975 | A1 * | 6/2023 | Yankowitz | B60N 2/90<br>320/108 |
| 2025/0065779 | A1 * | 2/2025 | Ito | B60N 2/06 |
| 2025/0091483 | A1 * | 3/2025 | Bae | B60N 2/02253 |
| 2025/0260307 | A1 * | 8/2025 | Koh | B60N 2/06 |
| 2025/0309782 | A1 * | 10/2025 | Jia | H02M 7/04 |
| 2025/0333012 | A1 * | 10/2025 | Sugita | B60N 2/0264 |

FOREIGN PATENT DOCUMENTS

| | | | |
|---|---|---|---|
| KR | 10-2013-0105730 | A | 9/2013 |
| KR | 10-2015-0119618 | A | 10/2015 |

OTHER PUBLICATIONS

Decision to Grant dated Jun. 8, 2026 from Korean Application No. 10-2024-0020750.

* cited by examiner

APPARATUS FOR SUPPLYING POWER TO SEAT

CROSS-REFERENCE TO RELATED APPLICATION

This application claims priority under 35 U.S.C. § 119(a) from Korean Patent Application No. 10-2024-0020750, filed on Feb. 14, 2024 and the entire contents of which are incorporated herein by reference.

BACKGROUND

(a) Technical Field

The present disclosure relates to an apparatus for supplying power to a seat capable of stably supplying power to an operative part of the seat without being affected by an installation direction of the seat installed inside a vehicle.

(b) Background Art

Various electrical components such as a motor for driving a seat, a seat heater, a fan for ventilation, and a bladder for massage are installed inside the seat, which is installed in a vehicle. Accordingly, a device for supplying power to an operative part of the seat is installed inside or on the seat.

In general, a vehicle seat is assembled as a seat assembly in a rail-integrated manner, and after assembly on a vehicle, voltage is supplied through a connector. However, there is a need for a seat to be detachably attachable to a rail, and thus the seat may be attached to the rail so that an installation direction of the seat is opposite to a travel direction of the vehicle.

Referring to FIG. 1, an installation direction of seats 51 or 53 installed inside a vehicle may be adjusted. In general, the first seat 51 may be installed in a state allowing a passenger to ride in a travel direction of the vehicle. However, the second seat 53 may be installed so that the passenger may ride in an opposite direction to the travel direction of the vehicle. The first seat 51 and the second seat 53 are not separate seats and are distinguished according to the installation direction of each of the seats 51 and 53. The seats 51 and 53 may be supplied with power through rails 30 and 40 disposed on a floor of the vehicle. Among the rails 30 and 40, the first rail 30 is a rail for applying a forward voltage and the second rail 40 is a rail connected to the ground. However, when a forward direct current (DC) voltage is applied to the first seat 51 through the rails 30 and 40, a reverse DC voltage is applied to the seat 53. In this instance, there is a problem in that control of the second seat 53 becomes impossible as reverse voltage is applied to the second seat 53 installed in the opposite direction to the travel direction of the vehicle.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with prior art.

A technical challenge of the present disclosure is to provide an apparatus for supplying power to a seat capable of stably supplying power to an operative part of the seat without being affected by an installation direction of the seat installed inside a vehicle.

A technical challenge of the present disclosure is to provide an apparatus for supplying power to a seat capable of independently blocking power supply based on heat generation of a circuit and a seat electrical component disposed inside the vehicle.

In one aspect, the present disclosure provides a seat power supply apparatus. The seat power supply apparatus includes a rectifier circuit configured to rectify an input voltage input through a slide rail of a seat, a protection circuit including a protection transistor connected to the rectifier circuit to block a voltage output from the rectifier circuit, and a logic circuit including a switching element connected to a gate of the protection transistor to control on or off of the protection transistor, wherein the protection transistor is turned on or off according to on or off of the switching element so that output of the protection circuit is controlled.

In a preferred embodiment, the rectifier circuit may include a first transistor, a second transistor, a third transistor and a fourth transistor, and a sign of a direct current (DC) voltage output from the protection circuit may be the same regardless of a direction in which the seat is installed in a vehicle.

In another preferred embodiment, the rectifier circuit may further include an overvoltage protection circuit connected between a source and a gate of each of the first transistor, the second transistor, the third transistor, the fourth transistor, and the protection transistor.

In still another preferred embodiment, the logic circuit may include a Schmitt trigger connected to a base of the switching element and a measurement circuit connected to an input terminal of the Schmitt trigger.

In yet another preferred embodiment, output from the measurement circuit that is input to the Schmitt trigger and configured to measure at least one of a temperature of the rectifier circuit or a seat electrical component disposed inside the seat, an output voltage output by the protection circuit, and an output current output by the protection circuit may vary, and on or off of the switching element may be configured to be controlled according to a hysteresis characteristic of the Schmitt trigger.

In still yet another preferred embodiment, the Schmitt trigger may output a two-stage output value according to output from the measurement circuit input to the Schmitt trigger, when the switching element is turned off according to a first output value, the protection transistor may be turned off, and output through the protection circuit may be blocked, and when the switching element is turned on according to a second output value, the protection transistor may be turned on, and a voltage rectified by the rectifier circuit may be output through the protection circuit.

In a further preferred embodiment, the measurement circuit may be a temperature measurement circuit including a plurality of resistors, and a voltage input to the Schmitt trigger may be changed by adjusting a value of each of the resistors, thereby adjusting a hysteresis range of the Schmitt trigger.

In another further preferred embodiment, the logic circuit may further include a constant voltage circuit for converting a voltage output from the rectifier circuit into a constant voltage, and a constant voltage output from the constant voltage circuit may be provided to the Schmitt trigger and the measurement circuit.

In still another further preferred embodiment, an output voltage output through the protection circuit may be supplied to at least one of a seat electrical component incorporated in the seat and a battery incorporated in the seat.

In another aspect, the present disclosure provides a seat power supply apparatus. The seat power supply apparatus includes a rectifier circuit configured to rectify an input voltage input through a slide rail of a seat, and a protection circuit configured to block a voltage output from the rectifier circuit to an operative part of the seat based on at least one of a temperature of the rectifier circuit and a temperature of a seat electrical component disposed inside the seat, wherein the protection circuit compares the temperature of the rectifier circuit or the temperature of the seat electrical component with a preset temperature to block supply of a voltage output from the rectifier circuit to an operative part of the seat.

In a preferred embodiment, the protection circuit may be a positive temperature coefficient (PTC) circuit, and when at least one of the temperature of the rectifier circuit and the temperature of the seat electrical component disposed inside the seat is greater than or equal to the preset temperature, resistance of the PTC circuit may increase to block supply of a voltage to an operative part of the seat.

In another preferred embodiment, the protection circuit may be a bimetal device, and when at least one of the temperature of the rectifier circuit and the temperature of the seat electrical component disposed inside the seat is greater than or equal to the preset temperature, connection between the bimetal device and a line for supplying a voltage to an operative part of the seat may be interrupted.

In still another preferred embodiment, the rectifier circuit may include a first transistor, a second transistor, a third transistor, and a fourth transistor, each of the first transistor and the second transistor may be a P-channel MOSFET (PMOS), and each of the third transistor and the fourth transistor may be an N-channel MOSFET (NMOS).

In yet another preferred embodiment, different voltages may be applied to gate terminals of the first transistor and the third transistor and gate terminals of the second transistor and the fourth transistor.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
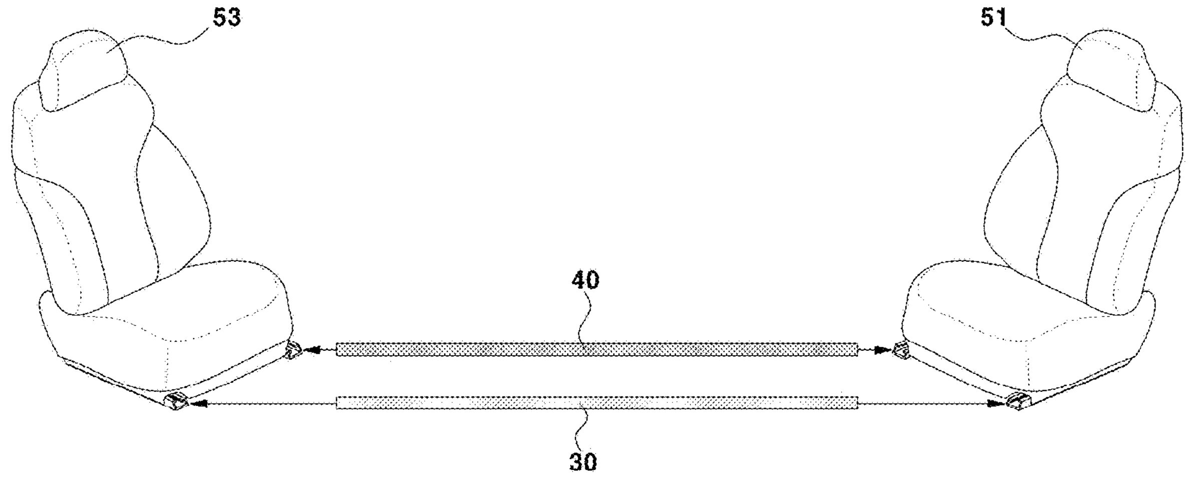
FIG. 1 is a diagram for describing that a voltage supplied to a seat varies according to an installation direction of the seat.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The advantages and features of the present disclosure, and a method of achieving the same, will become apparent with reference to the embodiments described below in detail together with the accompanying drawings. However, the present disclosure is not limited to the embodiments disclosed below and may be implemented in various different forms, the present embodiments are provided only to ensure that the present disclosure is complete and to fully inform a person skilled in the art to which the present disclosure pertains of the scope of the claims, and the present disclosure is defined only by the scope of the claims. Like reference numerals refer to like elements throughout the specification.

In addition, in this specification, first, second, etc. are added to names of components to distinguish the components when the names of the components are the same, and the order in the description below is not necessarily limited to that order.

The detailed description illustrates the present disclosure. In addition, the above-described content illustrates and describes preferred embodiments of the present disclosure, and the present disclosure may be used in various other combinations, modifications, and environments. That is, changes or modifications are possible within the scope of the inventive concept disclosed in this specification, the scope equivalent to the disclosed content described, and/or the scope of technology or knowledge in the art. The described embodiments are intended to best illustrate the technical idea of the present disclosure, and various modifications required for specific application fields and uses of the present disclosure are possible. Therefore, the detailed description of the disclosure is not intended to limit the present disclosure to the disclosed embodiments. In addition, the appended claims should be interpreted to include other embodiments.

Figure 2:
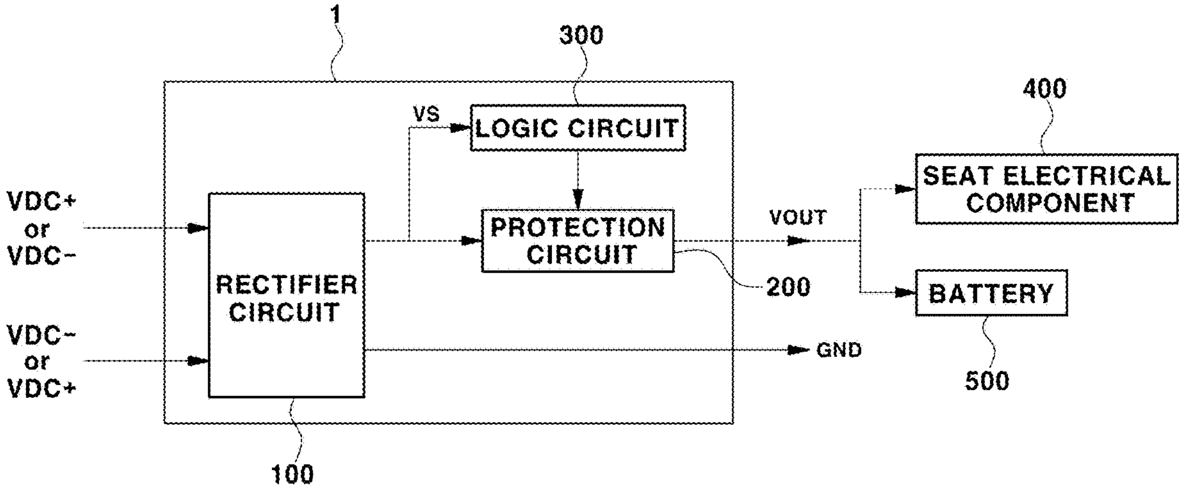
FIG. 2 is a diagram for schematically describing a seat power supply apparatus according to an embodiment of the present disclosure.

FIG. 2 is a diagram for schematically describing a seat power supply apparatus according to an embodiment of the present disclosure.

Referring to FIG. 2, the seat power supply apparatus 1 may include a rectifier circuit 100, a protection circuit 200, and a logic circuit 300. A forward DC voltage or a reverse DC voltage may be input to the seat power supply apparatus 1.

The rectifier circuit 100 may rectify an input voltage input through a slide rail for sliding a seat installed in a vehicle. For example, the rectifier circuit 100 may be a full bridge rectifier circuit. The rectifier circuit 100 may maintain the form of an output voltage constant regardless of whether a DC voltage applied to the seat power supply apparatus 1 is a forward voltage or a reverse voltage. For example, the constant form of the output voltage may mean that the sign of the output voltage is the same regardless of the sign of an input voltage, and even when the input DC voltage is a positive voltage or a negative voltage, the DC voltage output from the seat power supply apparatus 1 may always be a negative voltage or a positive voltage.

The protection circuit 200 may control whether to supply a rectified voltage Vs output from the rectifier circuit 100 to an operative part of the seat. The protection circuit 200 may block output of the rectified voltage Vs when a temperature of the rectifier circuit 100 is excessively high, the rectified voltage Vs is excessively high, or the current output from the seat power supply apparatus 1 is excessively high.

The logic circuit 300 may control the protection circuit 200 by monitoring at least one of the temperature of the rectifier circuit 100, a temperature of the seat electrical component 400 installed inside the seat, and a voltage or current output from the seat power supply apparatus 1. For example, when the temperature of the rectifier circuit 100 or the temperature of the seat electrical component 400 installed inside the seat is higher than a preset temperature, or when the voltage or current output from the seat power supply apparatus 1 is higher than a preset value, the protection circuit 200 may be turned off.

The protection circuit 200 and the logic circuit 300 may be disposed together with the rectifier circuit 100 at the same location inside the seat. However, the protection circuit 200 and the logic circuit 300 may be disposed at locations related to the seat electrical component 400 installed inside the seat. For example, the protection circuit 200 and the logic circuit 300 may be disposed adjacent to a motor for driving the seat, so that the logic circuit 300 may be controlled according to a temperature of the motor.

The power output from the seat power supply apparatus 1 may be supplied to the seat electrical component 400 installed inside the seat or to a battery 500 installed inside or outside the seat. For example, the seat electrical component 400 may include a motor for driving the seat, a circuit for controlling the seat, a fan installed in the seat, etc.

According to an embodiment of the present disclosure, when the rectifier circuit 100 or the seat electrical component 400 installed in the seat is excessively heated or the voltage or current supplied to the seat is excessively high, power supplied to the seat may be blocked to ensure durability of the seat power supply apparatus 1 or the seat electrical component 400.

According to an embodiment of the present disclosure, power applied to the seat may be blocked through the protection circuit 200 and the logic circuit 300, so that a separate configuration for blocking overvoltage and overcurrent applied to the seat electrical component 400 may be eliminated.

Figure 3:
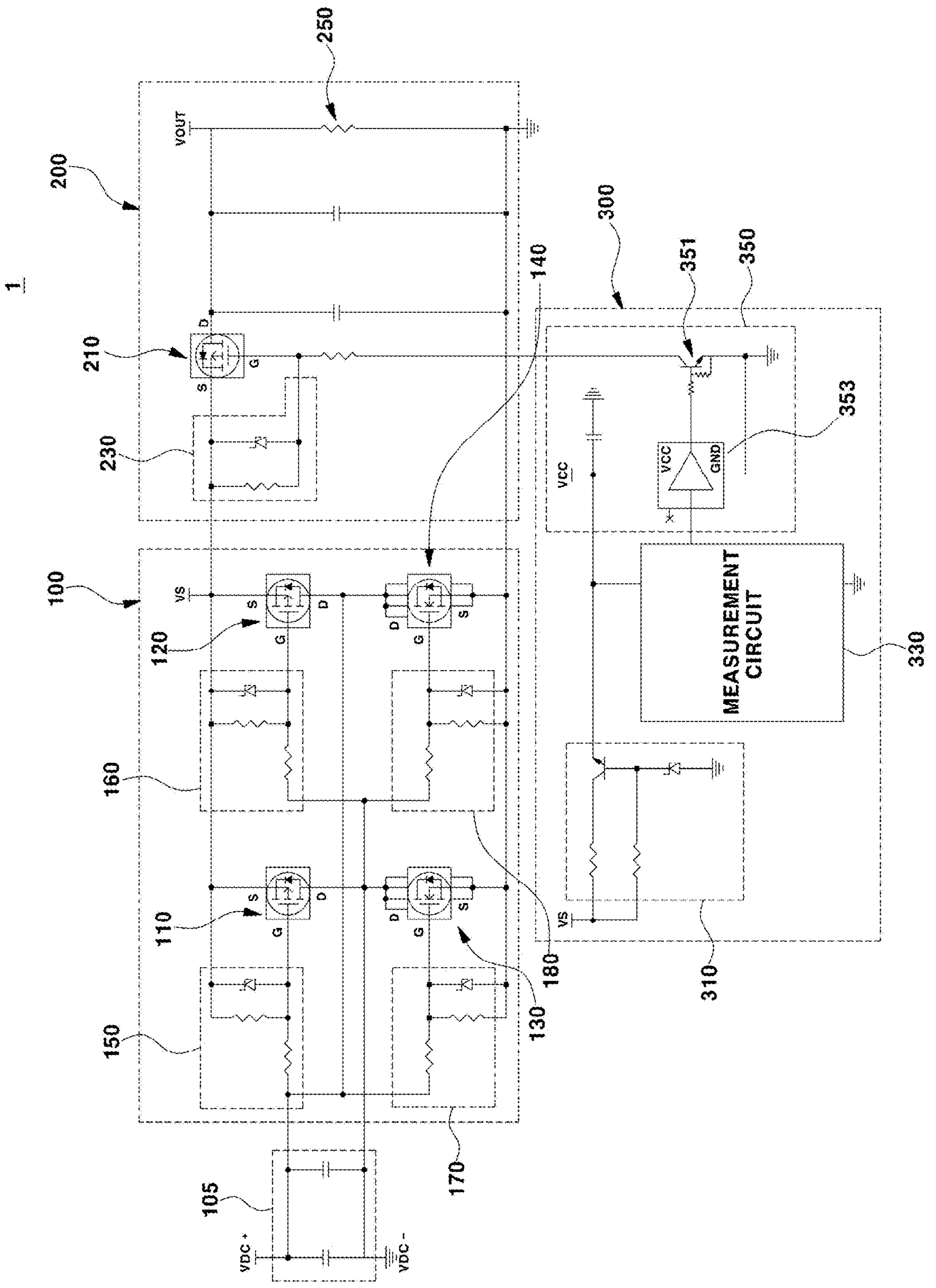
FIG. 3 is a circuit diagram of the seat power supply apparatus according to an embodiment of the present disclosure.

FIG. 3 is a circuit diagram of the seat power supply apparatus according to an embodiment of the present disclosure.

Referring to FIGS. 2 and 3, the rectifier circuit 100 may rectify an input voltage input through the slide rail of the seat. The rectifier circuit 100 may include a first transistor 110, a second transistor 120, a third transistor 130, and a fourth transistor 140. For example, each of the first transistor 110, the second transistor 120, the third transistor 130, and the fourth transistor 140 may be an Insulated Gate Bipolar Transistor (IGBT) or a Metal-Oxide-Semiconductor Field-Effect Transistor (MOSFET). The first transistor 110, the second transistor 120, the third transistor 130, and the fourth transistor 140 may be full-bridge rectifier circuits.

A DC-link capacitor 105 may be disposed at an input terminal of the seat power supply apparatus 1. The DC-link capacitor 105 may be connected in parallel with the input terminal to which an input voltage input from the slide rail of the seat is applied. The DC-link capacitor 105 may serve as a buffer that maintains a constant voltage between the input terminal and the rectifier circuit 100.

The first transistor 110 may include a gate terminal G that receives a gate signal to perform an ON/OFF operation according to a direction (or level) of an input voltage, a source terminal S connected to one terminal of the DC-link capacitor 105, and a drain terminal D connected to gate terminals G of the second transistor 120 and the fourth transistor 140. For example, the first transistor 110 may be a PMOS The drain terminal D of the first transistor 110 may be connected to the other terminal of the DC-link capacitor 105.

The second transistor 120 may include the gate terminal G that receives a gate signal to perform an ON/OFF operation depending on the direction (or level) of the input voltage, a source terminal S that is connected to the one terminal of the DC-link capacitor 105, and a drain terminal D connected to a drain terminal D of the fourth transistor 140. For example, the second transistor 120 may be a PMOS. The drain terminal D of the second transistor 120 may be connected to the one terminal of the DC-link capacitor 105 and the drain terminal D of the first transistor 110.

The third transistor 130 may include a gate terminal G that receives a gate signal to perform an ON/OFF operation depending on the direction (or level) of the input voltage, a source terminal S connected to the one terminal of the DC-link capacitor 105, and a drain terminal D connected to the gate terminals G of the second transistor 120 and the fourth transistor 140. As an example, the third transistor 110 may be an NMOS. The drain terminal D of the third transistor 130 may be connected to the other terminal of the DC-link capacitor 105.

The fourth transistor 140 may include the gate terminal G that receives a gate signal to perform an ON/OFF operation depending on the direction (or level) of the input voltage, a source terminal S connected to the one terminal of the DC-link capacitor 105, and the drain terminal D connected to the drain terminal D of the second transistor 120. For example, the fourth transistor 120 may be an NMOS. The drain terminal D of the fourth transistor 140 may be connected to the one terminal of the DC-link capacitor 105 and the drain terminal D of the second transistor 120.

Since the first transistor 110, the second transistor 120, the third transistor 130, and the fourth transistor 140 form a full-bridge rectifier circuit, the output voltage of the rectifier circuit 100 may always be a positive voltage. Different voltages may be applied to the gate terminals G of the first transistor 110 and the third transistor 130 and the gate terminals G of the second transistor 120 and the fourth transistor 140.

For example, when a forward input voltage is input, the gate terminal G of the first transistor 110 and the gate terminal G of the third transistor 130 may be connected to the one terminal of the DC-link capacitor 105 to which a HIGH level voltage is applied. The first transistor 110, which is a PMOS, may be turned off, and the third transistor 130, which is an NMOS, may be turned on. The gate terminal G of the second transistor 120 and the gate terminal G of the fourth transistor 140 may be connected to the other terminal of the DC-link capacitor 105 to which a LOW level voltage is applied. The second transistor 120, which is a PMOS, may be turned on, and the fourth transistor 130, which is an NMOS, may be turned off. As the second transistor 120 and the third transistor 130 are turned on, the rectified voltage Vs output from the rectifier circuit 100 may be a positive voltage.

For example, when a reverse input voltage is input, the gate terminal G of the first transistor 110 and the gate terminal G of the third transistor 130 may be connected to the one terminal of the DC-link capacitor 105 to which a LOW level voltage is applied. The first transistor 110, which is a PMOS, may be turned on, and the third transistor 130, which is an NMOS, may be turned off. The gate terminal G of the second transistor 120 and the gate terminal G of the fourth transistor 140 may be connected to the other terminal of the DC-link capacitor 105 to which a HIGH level voltage is applied. The second transistor 120, which is a PMOS, may be turned off, and the fourth transistor 130, which is an NMOS, may be turned on. As the first transistor 110 and the fourth transistor 140 are turned on, the rectified voltage Vs output from the rectifier circuit 100 may be a positive voltage.

Overvoltage protection circuits 150, 160, 170, and 180 may be disposed between the gate terminals G and the source terminals S of the first transistor 110, the second transistor 120, the third transistor 130, and the fourth transistor 140, respectively. Specifically, the overvoltage protection circuits 150, 160, 170, and 180 may include a first overvoltage protection circuit 150 disposed between the gate terminal G and the source terminal S of the first transistor 110, a second overvoltage protection circuit 160 disposed between the gate terminal G and the source terminal S of the second transistor 120, a third overvoltage protection circuit 170 disposed between the gate terminal G and the source terminal S of the third transistor 130, and a fourth overvoltage protection circuit 180 disposed between the gate terminal G and the source terminal S of the fourth transistor 140. Each of the overvoltage protection circuits 150, 160, 170, and 180 may include a plurality of resistors and a Zener diode.

The protection circuit 200 may be connected to the rectifier circuit 100 to block a voltage output from the rectifier circuit 100. The protection circuit 200 may include a protection transistor 210 that blocks the voltage output from the rectifier circuit 100 and a fifth overvoltage protection circuit 230. For example, the protection transistor 210 may be an IGBT or a MOSFET. Specifically, the protection transistor 210 may be a PMOS. On/off of the gate terminal G of the protection transistor 210 may be controlled by the logic circuit 300. A source terminal S of the protection transistor 210 may be connected to the rectifier circuit 100, and a drain source terminal D of the protection transistor 210 may be connected to an output terminal of the seat power supply apparatus 1. The source terminal S of the protection transistor 210 may be connected to the source terminal S of the second transistor 120.

The fifth overvoltage protection circuit 230 may be disposed between the gate terminal G and the source terminal S of the protection transistor 210. The fifth overvoltage protection circuit 230 may include a plurality of resistors and a Zener diode.

The protection circuit 200 may include a resistor 250 connected to the output terminal of the seat power supply apparatus 1 to form a closed circuit of the entire circuit.

The logic circuit 300 may control on/off of the protection circuit 200. The logic circuit 300 may control on/off of the protection circuit 200 based on at least one of a temperature of the rectifier circuit 100 or the seat electrical component 400 disposed inside the seat, an output voltage output by the protection circuit 200, and an output current output by the protection circuit 200. The logic circuit 300 may include a constant voltage circuit 310, a measurement circuit 330, and a control circuit 350.

The constant voltage circuit 310 may convert a voltage output by the rectifier circuit 100 into a constant voltage. The constant voltage circuit 310 may include a plurality of resistors, a Zener diode, and a switching element. The switching element included in the constant voltage circuit 310 may be an NPN transistor. The constant voltage output by the constant voltage circuit 310 may be applied to the measurement circuit 330 and the control circuit 350.

The measurement circuit 330 may measure at least one of the temperature of the rectifier circuit 100 or the seat electrical component 400 disposed inside the seat, the output voltage output by the protection circuit 200, and the output current output by the protection circuit 200. The measurement circuit 330 may be designed as a circuit of various types depending on the factor to be measured. The measurement circuit 330 may receive the constant voltage output from the constant voltage circuit 310. A voltage output by the measurement circuit 330 may be applied to the control circuit 350.

The control circuit 350 may output a voltage for controlling on/off of the protection transistor 210 of the protection circuit 200 based on the voltage output by the measurement circuit 330. The control circuit 350 may include a switching element 351 connected to the gate terminal G of the protection transistor 210 to block overvoltage or overcurrent of the gate terminal G of the protection transistor 210 and a Schmitt trigger 353 connected to a base of the switching element 351. For example, the switching element 351 may be an NPN transistor. The base of the switching element 351 may be connected to the Schmitt trigger 353, an emitter of the switching element 351 may be connected to the ground, and a collector of the switching element 351 may be connected to the protection transistor 210. An input terminal of the Schmitt trigger 353 may be connected to the measurement circuit 330. A constant voltage output from the constant voltage circuit 310 may be applied to the Schmitt trigger 353. The Schmitt trigger 353 is a configuration designed to ensure stable operation against noise or interference of an input signal, and the Schmitt trigger 353 may output two-stage output values. The Schmitt trigger 353 may output two-stage output values depending on a voltage output by the measurement circuit 330 measuring at least one of the temperature of the rectifier circuit 100 or the seat electrical component 400 disposed inside the seat, the output voltage output by the protection circuit 200, and the output current output by the protection circuit 200. In other words, the Schmitt trigger 353 may output two different output values using two threshold values. For example, the hysteresis characteristic of the Schmitt trigger 353 maintains a high output level when the input voltage exceeds a positive threshold value, and maintains a low output level when the input voltage falls below a negative threshold value. According to the hysteresis characteristic of the Schmitt trigger 353, on/off of the switching element 351 may be controlled. That is, the Schmitt trigger 353 may serve to control on/off of the switching element 351.

For example, when the Schmitt trigger 353 outputs a first output value, the switching element 351 may be turned off, and the protection transistor 210 may be turned off, so that output through the protection circuit 200 may be blocked.

For example, when the Schmitt trigger 353 outputs a second output value, the switching element 351 may be turned on, and the protection transistor 210 may be turned on, so that the rectified voltage Vs rectified by the rectifier circuit 100 may be output through the protection circuit 200. The second output value may be a higher value than the first output value.

According to an embodiment of the present disclosure, the seat power supply apparatus 1 for supplying power to the seat includes the rectifier circuit 100, so that a forward voltage may be applied to the seat regardless of a direction of the applied voltage, which varies depending on the installation direction of the seat.

According to an embodiment of the present disclosure, a state of a voltage output by the Schmitt trigger 353 changes depending on the state of various factors measured by the measurement circuit 330, and accordingly, the switching element 351 is controlled, thereby controlling on/off of the protection transistor 210 to block a voltage output by the seat power supply apparatus 1. In this way, overheating of various circuits and the seat electrical components 400 included in the seat power supply apparatus 1 may be prevented.

Figure 4:
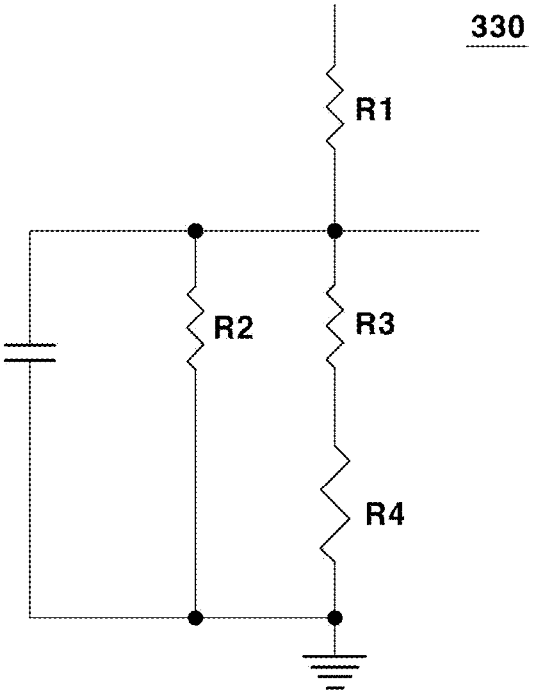
FIG. 4 is a diagram illustrating a measurement circuit of the seat power supply apparatus according to an embodiment of the present disclosure.

FIG. 4 is a diagram illustrating the measurement circuit of the seat power supply apparatus according to an embodiment of the present disclosure.

Referring to FIG. 3 and FIG. 4, the measurement circuit 330 may be a circuit for measuring the temperature of the rectifier circuit 100 or the seat electrical component 400 disposed inside the seat. The measurement circuit 330 may be a temperature measurement circuit including a plurality of resistors R1, R2, and R3. By adjusting a value of each of the plurality of resistors R1, R2, and R3, a voltage input to the Schmitt trigger 353 may be changed. Accordingly, a hysteresis range of the Schmitt trigger 353 may be adjusted. For example, the measurement circuit 330 may be designed so that power supply by the seat power supply apparatus 1 may be blocked when the temperature of the rectifier circuit 100 or the seat electrical component 400 disposed inside the seat is 120° C. or higher. That is, the measurement circuit 330 may be designed so that the Schmitt trigger 353 outputs a low level output value by a voltage output by the measurement circuit 330 when the temperature of the rectifier circuit 100 or the seat electrical component 400 disposed inside the seat is 120° C. or higher. A resistor R4 may refer to a type of resistance temperature sensor having a characteristic in which the resistance changes depending on the temperature.

Figure 5:
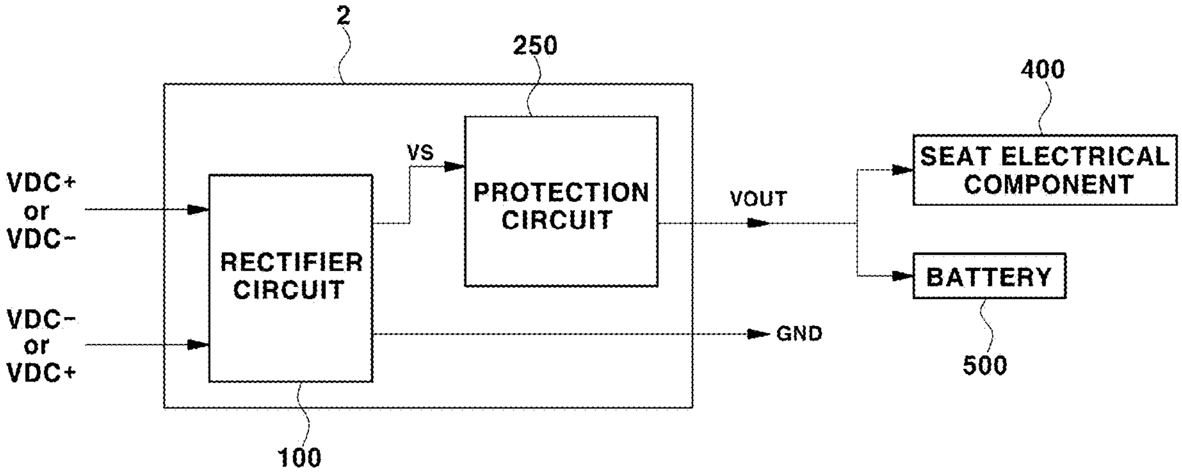
FIG. 5 is a diagram for describing a modified example of the seat power supply apparatus according to an embodiment of the present disclosure.

FIG. 5 is a diagram for describing a modified example of the seat power supply apparatus according to an embodiment of the present disclosure. For simplicity of description, description of content overlapping with that of FIG. 2 is omitted.

Referring to FIG. 5, a seat power supply apparatus 2 may include a rectifier circuit 100 and a protection circuit 250. A forward DC voltage or a reverse DC voltage may be input to the seat power supply apparatus 2.

The rectifier circuit 100 may rectify an input voltage input through a slide rail for sliding a seat installed in the vehicle. For example, the rectifier circuit 100 may be a full bridge rectifier circuit. The rectifier circuit 100 may maintain the form of an output voltage constant regardless of whether a DC voltage applied to the seat power supply apparatus 1 is a forward voltage or a reverse voltage.

The protection circuit 250 may control whether the rectified voltage Vs output from the rectifier circuit 100 is supplied to an operative part of the seat. The protection circuit 250 may block output of the rectified voltage Vs when the temperature of the rectifier circuit 100 is excessively high, the rectified voltage Vs is excessively high, or the current output from the seat power supply apparatus 1 is excessively high. In addition, the protection circuit 250 may be related to the rectifier circuit 100 or the seat electrical component 400 to control whether the voltage output from the rectifier circuit 100 is supplied to an operative part of the seat according to the temperature of the rectifier circuit 100 or the seat electrical component 400. For example, the protection circuit 250 may compare the temperature of the rectifier circuit 100 or the temperature of the seat electrical component 400 with a preset temperature, and block supply of a voltage output from the rectifier circuit 100 to an operative part of the seat.

For example, the protection circuit 250 may be a positive temperature coefficient (PTC) circuit. When at least one of the temperature of the rectifier circuit 100 or the temperature of the seat electrical component 400 disposed inside the seat is higher than a preset temperature, the resistance of the PTC circuit may increase to block supply of voltage to an operative part of the seat. The PTC circuit is a circuit including a resistor whose resistance changes depending on the temperature, and when the temperature increases, the resistance value increases to block supply of voltage. A specific design of the PTC circuit may be changed by a designer.

For example, the protection circuit 250 may be a bimetal device. When at least one of the temperature of the rectifier circuit 100 or the temperature of the seat electrical component 400 disposed inside the seat is higher than a preset temperature, connection between the bimetal device and a line supplying voltage to an operative part of the seat may be interrupted. In general, the bimetal device is a rod-shaped component obtained by bonding two types of thin metal plates having significantly different coefficients thermal expansion together into one sheet, and may control connection between the rectifier circuit 100 and the line supplying voltage to an operative part of the seat by utilizing the property of bending when heated. A specific design of the bimetal device may be changed by the designer.

The protection circuit 250 may be formed in components that require protection against overheating. For example, to protect the rectifier circuit 100 against overheating, the protection circuit 250 may be disposed inside the seat together with the rectifier circuit 100. For example, to protect the motor for driving the seat against overheating, the protection circuit 250 may be disposed inside the seat together with the motor.

According to an embodiment of the present disclosure, the seat power supply apparatus for supplying power to the seat includes the rectifier circuit, so that a forward voltage may be applied to the seat regardless of a direction of the applied voltage, which varies depending on the installation direction of the seat.

According to an embodiment of the present disclosure, when the rectifier circuit or the seat electrical component installed in the seat is excessively heated or the voltage or current supplied to the seat is excessively high, power supplied to the seat may be blocked to ensure durability of the seat power supply apparatus or the seat electrical component.

According to an embodiment of the present disclosure, power applied to the seat may be blocked through the protection circuit and the logic circuit, so that a separate configuration for blocking overvoltage and overcurrent applied to the seat electrical component may be eliminated.

According to an embodiment of the present disclosure, a state of a voltage output by the Schmitt trigger changes depending on the state of various factors measured by the measurement circuit, and accordingly, the switching element is controlled, thereby controlling on/off of the protection transistor to block a voltage output by the seat power supply apparatus. In this way, overheating of various circuits and the seat electrical components included in the seat power supply apparatus may be prevented.

Even though the embodiments of the present disclosure have been described above with reference to the attached drawings, those skilled in the art to which the present disclosure pertains will understand that the present disclosure may be implemented in other specific forms without changing the technical idea or essential characteristics thereof. Therefore, it should be understood that the embodiments described above are illustrative and not restrictive in all respects.

What is claimed is:

1. An apparatus for supplying power to a seat, the apparatus comprising:
 a rectifier circuit configured to rectify an input voltage input through a slide rail of a seat;
 a protection circuit including a protection transistor connected to the rectifier circuit to block a voltage output from the rectifier circuit; and
 a logic circuit including a switching element connected to a gate of the protection transistor to control on/off of the protection transistor,
 wherein the protection transistor is configured to be turned on or off according to on or off of the switching element so that output of the protection circuit is controlled.

2. The apparatus of claim 1, wherein:
 the rectifier circuit comprises a first transistor, a second transistor, a third transistor, and a fourth transistor, and
 a sign of a direct current (DC) voltage output from the protection circuit is the same regardless of a direction in which the seat is installed in a vehicle.

3. The apparatus of claim 2, wherein the rectifier circuit further comprises an overvoltage protection circuit connected between a source and a gate of each of the first transistor, the second transistor, the third transistor, the fourth transistor, and the protection transistor.

4. The apparatus of claim 1, wherein the logic circuit comprises a Schmitt trigger connected to a base of the switching element and a measurement circuit connected to an input terminal of the Schmitt trigger.

5. The apparatus of claim 4, wherein output from the measurement circuit that is input to the Schmitt trigger and configured to measure at least one of a temperature of the rectifier circuit or a seat electrical component disposed inside the seat, an output voltage output by the protection circuit, and an output current output by the protection circuit varies, and on or off of the switching element is configured to be controlled according to a hysteresis characteristic of the Schmitt trigger.

6. The apparatus of claim 5, wherein:
 the Schmitt trigger is configured to output a two-stage output value according to output from the measurement circuit input to the Schmitt trigger,
 when the switching element is turned off according to a first output value, the protection transistor is configured to be turned off, and output through the protection circuit is configured to be blocked, and
 when the switching element is turned on according to a second output value, the protection transistor is configured to be turned on, and a voltage rectified by the rectifier circuit is configured to be output through the protection circuit.

7. The apparatus of claim 4, wherein:
 the measurement circuit is a temperature measurement circuit including a plurality of resistors, and
 a voltage input to the Schmitt trigger is configured to be changed by adjusting a value of each of the resistors, thereby adjusting a hysteresis range of the Schmitt trigger.

8. The apparatus of claim 4, wherein:
 the logic circuit further comprises a constant voltage circuit for converting a voltage output from the rectifier circuit into a constant voltage, and
 a constant voltage output from the constant voltage circuit is configured to be provided to the Schmitt trigger and the measurement circuit.

9. The apparatus of claim 1, wherein an output voltage output through the protection circuit is configured to be supplied to at least one of a seat electrical component incorporated in the seat and a battery incorporated in the seat.

10. An apparatus for supplying power to a seat, the apparatus comprising:
 a rectifier circuit configured to rectify an input voltage input through a slide rail of a seat; and
 a protection circuit configured to block a voltage output from the rectifier circuit to an operative part of the seat based on at least one of a temperature of the rectifier circuit and a temperature of a seat electrical component disposed inside the seat,
 wherein the protection circuit compares the temperature of the rectifier circuit or the temperature of the seat electrical component with a preset temperature to block supply of a voltage output from the rectifier circuit to the operative part of the seat.

11. The apparatus of claim 10, wherein:
 the protection circuit is a positive temperature coefficient (PTC) circuit, and
 when at least one of the temperature of the rectifier circuit and the temperature of the seat electrical component disposed inside the seat is greater than or equal to the preset temperature, resistance of the PTC circuit is configured to increase to block supply of a voltage to the operative part of the seat.

12. The apparatus of claim 10, wherein:
 the protection circuit is a bimetal device, and
 when at least one of the temperature of the rectifier circuit and the temperature of the seat electrical component disposed inside the seat is greater than or equal to the preset temperature, connection between the bimetal device and a line for supplying a voltage to the operative part of the seat is configured to be interrupted.

13. The apparatus of claim 10, wherein:
 the rectifier circuit comprises a first transistor, a second transistor, a third transistor, and a fourth transistor,
 each of the first transistor and the second transistor is a P-channel MOSFET (PMOS), and each of the third transistor and the fourth transistor is an N-channel MOSFET (NMOS).

14. The apparatus of claim 13, wherein different voltages are configured to be applied to gate terminals of the first transistor and the third transistor and gate terminals of the second transistor and the fourth transistor.

* * * * *